(12) United States Patent
Trim et al.

(10) Patent No.: US 11,640,379 B2
(45) Date of Patent: May 2, 2023

(54) METADATA DECOMPOSITION FOR GRAPH TRANSFORMATION

(71) Applicant: Kyndryl, Inc., New York, NY (US)

(72) Inventors: Craig M. Trim, Ventura, CA (US);
Mary Rudden, Denver, CO (US);
Ahmed Nassar, Pflugerville, TX (US);
William G. Dusch, Morrisville, NC (US)

(73) Assignee: KYNDRYL, INC., New York, NY (US)

( * ) Notice: Subject to any disclaimer, the term of this patent is extended or adjusted under 35 U.S.C. 154(b) by 668 days.

(21) Appl. No.: 16/733,104

(22) Filed: Jan. 2, 2020

(65) Prior Publication Data

US 2021/0209072 A1 Jul. 8, 2021

(51) Int. Cl.
*G06F 16/21* (2019.01)
*G06Q 30/04* (2012.01)
*G06F 16/36* (2019.01)
*G06F 16/901* (2019.01)
*G06N 3/04* (2023.01)

(52) U.S. Cl.
CPC .......... *G06F 16/212* (2019.01); *G06F 16/367* (2019.01); *G06F 16/9024* (2019.01); *G06Q 30/04* (2013.01); *G06N 3/04* (2013.01)

(58) Field of Classification Search
CPC .. G06F 16/212; G06F 16/367; G06F 16/9024; G06F 40/146; G06F 16/23; G06Q 30/04; G06N 3/04; G06N 5/022; G06N 20/00
USPC ..................................................... 706/55, 50
See application file for complete search history.

(56) References Cited

U.S. PATENT DOCUMENTS

| 8,024,653 | B2* | 9/2011 | Bobick | G06N 5/022 |
| | | | | 715/255 |
| 8,244,662 | B2 | 8/2012 | Coury et al. | |
| 10,282,674 | B2 | 5/2019 | Adachi et al. | |
| 2010/0121792 | A1 | 5/2010 | Yang et al. | |
| 2011/0173189 | A1* | 7/2011 | Singh | G06F 16/9024 |
| | | | | 707/722 |
| 2016/0117322 | A1* | 4/2016 | Ramaswamy | G06F 16/951 |
| | | | | 707/756 |
| 2016/0292304 | A1* | 10/2016 | Kartha | G06F 40/30 |
| 2018/0247224 | A1 | 8/2018 | Garcia Duran et al. | |
| 2018/0349282 | A1 | 12/2018 | Brahm et al. | |

(Continued)

OTHER PUBLICATIONS

Lozano et al., Network Embedding by Walking on the Line Graph, ResearchGate, May 2019, https://wwwresearchgate.net/publication/333675172.

(Continued)

*Primary Examiner* — Evan Aspinwall
(74) *Attorney, Agent, or Firm* — Erik Swanson; Andrew M. Calderon; Calderon Safran & Cole. P.C.

(57) ABSTRACT

An embodiment includes identifying metadata attached to a first node of a graph, where the metadata satisfies an ontological condition. The embodiment also includes transforming the graph such that the transforming results in the graph having a new graph structure, where the transforming of the graph comprises removing the metadata from the first node and adding a second node representative of the metadata removed from the first node to the graph such that the second node is connected to the first node by a first edge.

25 Claims, 7 Drawing Sheets

(56) References Cited

U.S. PATENT DOCUMENTS

2019/0130264 A1 5/2019 Rossi et al.
2019/0286655 A1 9/2019 Leskovec et al.

OTHER PUBLICATIONS

Godec, Graph Embeddings—The Summary, Towards Data Science, Dec. 31, 2018, https://towardsdatascience.com/graph-embeddings-thesummary-cc6075aba007.

Manning et al., Lecture 2 Word Vector Representations: word2vec, Stanford University, Apr. 3, 2017, https://www.youtube.com/watch?v=ERibwqs9p38.

Wei et al., Contextualizing Airbnb by Building Knowledge Graph, Medium, Jan. 29, 2019, https://medium.com/airbnb-engineering/contextualizingairbnb-by-building-knowledge-graph-b7077e268d5a.

Perozzi et al., DeepWalk: Online Learning of Social Representations, Cornell University, Mar. 26, 2014, https://arxiv.org/abs/1403.6652.

McCormick et al., Word2Vec Tutorial—The Skip-Gram Model, McCormickml, Apr. 19, 2016, http://mccormickml.com/2016/04/19/word2vec-tutorial-the-skip-gram-model/.

Chang, Scaling Knowledge Access and Retrieval at Airbnb, Medium, Sep. 4, 2018, https://medium.com/airbnb-engineering/scaling-knowledge-access-and-retrieval-at-airbnb-665b6ba21e95.

Mikolov et al., Efficient Estimation of Word Representations in Vector Space, Sep. 7, 2013, https://arxiv.org/abs/1301.3781.

Narayanan et al., graph2vec: Learning Distributed Representations of Graphs, Jul. 17, 2017, https://arxiv.org/abs/1707.05005.

Goyal et al., Graph Embedding Techniques, Applications, and Performance: A Survey, Cornell University, Dec. 27, 2017, https://arxiv.org/abs/1705.02801.

* cited by examiner

METADATA DECOMPOSITION FOR GRAPH TRANSFORMATION

TECHNICAL FIELD

The present invention relates generally to a method, system, and computer program product for graph data modeling. More particularly, the present invention relates to a method, system, and computer program product for metadata decomposition for graph transformation.

BACKGROUND

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

One application of ANNs is Natural language processing (NLP), where neural networks are used for a variety of tasks such as text classification, speech recognition, semantic parsing and question answering. However, neural networks are mathematical algorithms that accept numbers rather than strings of text as inputs. In order to use a neural network with text, the text must first be converted to numbers. The ability to do so marks an important advancement in computer science.

There are a variety of techniques and algorithms that produce numerical representations of text. These techniques generally seek to find a numerical representations for words that an NLP system can understand. For example, vectorization involves deriving vector representations of words. Vectorization can be used to generate vectors for words in a body of text where the vectors are numerical distributions of how probable it is that a given word will appear in the context of another word.

SUMMARY

The illustrative embodiments provide for metadata decomposition for graph transformation. An embodiment includes loading into memory a graph having a graph structure, the graph being constructed according to an ontology and comprising a first node, the first node comprising metadata, the metadata satisfying an ontological condition according to the ontology. The embodiment also includes transforming, in memory, a new graph structure from the graph structure. The embodiment also includes the transforming comprising creating new data of the new graph structure. The embodiment also includes the transforming comprising detaching, in the new data of the new graph structure, the metadata from the first node. The embodiment also includes the transforming comprising associating, in the memory, the metadata with a second node. The embodiment also includes the transforming comprising referencing, in the memory, the first node in the new graph from the second node in the new graph. Other embodiments of this aspect include corresponding computer systems, apparatus, and computer programs recorded on one or more computer storage devices, each configured to perform the actions of the embodiment.

In an embodiment, the method includes the graph being a property graph. In an embodiment, the method includes the metadata being a key:value pair.

In an embodiment, the method includes the ontological condition being a user-specified condition.

In an embodiment, the ontological condition includes a semantic construct.

In an embodiment, the transforming of the graph further comprises removing metadata satisfying the ontological condition from a third node, and adding a fourth node representative of the metadata removed from the third node to the graph such that the fourth node is connected to the third node by a second edge. In an embodiment, the method includes adding a third edge connecting the second node and the fourth node.

In an embodiment, the method includes deriving a vector representation of the graph using an iterative process on the new graph structure that constructs a new vector comprising a probability distribution.

In an alternative embodiment, the illustrative embodiments provide for metadata decomposition for graph transformation. An embodiment includes loading into memory a graph structure, the graph being constructed according to an ontology and comprising first and second nodes, the first node comprising first metadata, the first metadata satisfying a first ontological condition according to the ontology, the second node comprising second metadata, the second metadata satisfying a second ontological condition according to the ontology. The embodiment also includes transforming, in memory, a new graph structure from the graph structure. The embodiment also includes the transforming including creating new data of the new graph structure. The embodiment also includes the transforming including detaching, in the new data of the new graph structure, the first metadata from the first node and the second metadata from the second node. The embodiment also includes the transforming including associating, in the memory, the first metadata with a third node and the second metadata with a fourth node. The embodiment also includes the transforming including referencing, in the memory, the first node in the new graph from the third node in the new graph and the second node in the new graph from the fourth node in the new graph. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Property graphs are becoming an increasingly important tool for data analytics, due to their explicit and fine-grained representation of relationships between entities. A property graph is composed of nodes, which represent entities, and edges, which represent relationships. Nodes have a unique identifiers and a sets of key:value pairs, or properties, that characterize them. Edges may also have unique identifiers, may be directed or undirected, and may have a set of key:value pairs that characterize the connections. As such, a graph is a topological construct of far greater complexity than a standard body of text, i.e., body of sequential words.

Vectorization of a graph is referred to as "embedding." The goal of graph embedding is to derive a vector representation of a graph. Depending on the graph's complexity, this can mean trying to find a latent vector representation of graph topology, as well as node-to-node relationships, edge information, key:value pairs, and other possible information that adds context to the graph. This complexity makes it difficult to construct an embedding process for deriving a vector representation of a graph without losing context for at least three reasons. First, it is difficult to include a description of properties of the graph, which can include, for example, graph topology, node connectivity, and node neighborhood (clustering propensity). Second, embedding layer size is a common embedding challenge. In general, it is desirable for an embedding approach to be efficient on large graphs and deal with sparsity effectively. The third reason involves embedding dimensionality. Longer embeddings preserve more information while they induce higher time and space complexity than shorter embeddings.

The illustrative embodiments used to describe the invention generally address and solve the above-described problem of ineffective embedding processes by expanding a graph prior to embedding to convert certain metadata into new nodes that improve the effectiveness of embedding algorithms. A "graph" as used herein is an abstract data type that is implements undirected graph and directed graph concepts from the mathematics field of graph theory, and can form any topology that is an abstract simplicial complex of a topological space, where an abstract simplicial complex is a simplicial complex of non-empty finite sets that is closed under the operation of taking non-empty subsets.

The illustrative embodiments recognize that certain metadata in graphs exists as node properties and is not considered by current embedding processes. This metadata may have ontological commonalities with metadata of other nodes that is also not considered by current embedding algorithms. Therefore, illustrative embodiments uses these ontological commonalities to select metadata to detach from nodes and then insert back into the graph as nodes. As a result, the metadata in the form of nodes is traversed by embedding algorithms rather than ignored. As a result, the additional information provided by the metadata enhances the quality of the embedding algorithms and thereby improves the quality of the output of embedding algorithms.

For example, in an embodiment, a graph transformation process loads a graph into memory. The graph transformation process also receives one or more ontological conditions, for example from user-input data or from data generated by an artificial-intelligence based process. In an embodiment, graph transformation process searches the graph for metadata satisfying the ontological condition(s). In an embodiment, the graph transformation process transforms the graph into a new graph structure. In an embodiment, this transformation includes detaching metadata that satisfies the ontological condition from a node and creating a new node from the metadata. In an embodiment, the new node is then connected, directly or indirectly (i.e., through another new node) to the node from which it was detached.

In an embodiment, a graph transformation process loads a graph into memory that is structured as a property graph. In an embodiment, the property graph includes a first node having a first key:value pair. In an embodiment, the graph transformation process uses an ontological condition to identify the first key:value pair as metadata that satisfies the ontological condition. In an embodiment, the transforms the property graph into a new graph structure. In an embodiment, this transformation includes detaching the first key:value pair the first node and creates a new second node that stores the data from the first key:value pair. In an embodiment, the new second node is connected to the first node by a new edge.

In an embodiment, a graph transformation process loads a graph into memory. In an embodiment, the graph transformation process also receives an ontological condition from memory, where the data was previously stored based on an operation performed by a user. For example, in an embodiment, a user previously examined the graph and provided an input that resulted in the ontological condition stored in memory. In an embodiment, graph transformation process searches the graph for metadata satisfying the ontological condition(s). In an embodiment, the graph transformation process transforms the graph into a new graph structure in which metadata satisfying the ontological condition is present in the graph as one or more new nodes.

In an embodiment, a graph transformation process receives a semantic construct as a search condition. In an embodiment, the graph transformation process searches a graph for metadata satisfying the search condition. In an embodiment, the graph transformation process transforms the graph into a new graph structure in which metadata satisfying the search condition is present in the graph as one or more new nodes.

In an embodiment, a graph transformation process loads a graph into memory. In an embodiment, the graph includes a first node having a first key:value pair. In an embodiment, the graph transformation process uses a semantic construct as an ontological condition to identify the first key:value pair as metadata that satisfies the ontological condition. In an embodiment, the transforms the graph into a new graph structure. In an embodiment, this transformation includes detaching the first key:value pair from the first node and creates a new second node that stores the data from the first key:value pair. In an embodiment, the new second node is connected to the first node by a new edge.

In an embodiment, a graph transformation process receives first and second ontological conditions as respective search conditions. In an embodiment, the graph transformation process searches a graph for metadata satisfying either of the first and second search conditions. In an embodiment, if metadata satisfies either of the first and second search conditions, the graph transformation process includes creating at least one new node that represents the metadata.

In an embodiment, a graph transformation process loads a graph into memory. The graph transformation process also receives an ontological condition. In an embodiment, graph transformation process searches the graph for metadata satisfying the ontological condition. In an embodiment, the graph transformation process transforms the graph into a new graph structure. In an embodiment, this transformation includes detaching metadata that satisfies the ontological condition from a first node and detaching metadata that satisfies the ontological condition from a second node. In an embodiment, the transformation includes creating a third node from the metadata detached from the first node and creating a fourth node from the metadata detached from the second node. In an embodiment, the transformation includes creating a first new edge connecting the third node to the first node and creating a second new edge connecting the fourth node to the second node. In an embodiment, the transformation includes creating a third new edge connecting the third node to the fourth node.

In an embodiment, a process receives an ontological condition as a search condition. In an embodiment, the process searches a graph for metadata satisfying the search condition. In an embodiment, if metadata satisfies the search condition, the process includes creating a new graph structure that includes at least one new node that represents the metadata. In an embodiment, the process derives a vector representation of the graph using an iterative process on the new graph structure that constructs a new vector comprising a probability distribution.

In an embodiment, a process receives an ontological condition as a search condition. In an embodiment, the process searches a graph for metadata satisfying the search condition. In an embodiment, if metadata satisfies the search condition, the process includes creating a new graph structure that includes at least one new node that represents the metadata. In an embodiment, the process derives new vector data representative of at least a portion of the graph using an iterative process on at least a portion of the new graph structure. In an embodiment, the process inputs the new vector data into a neural network.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
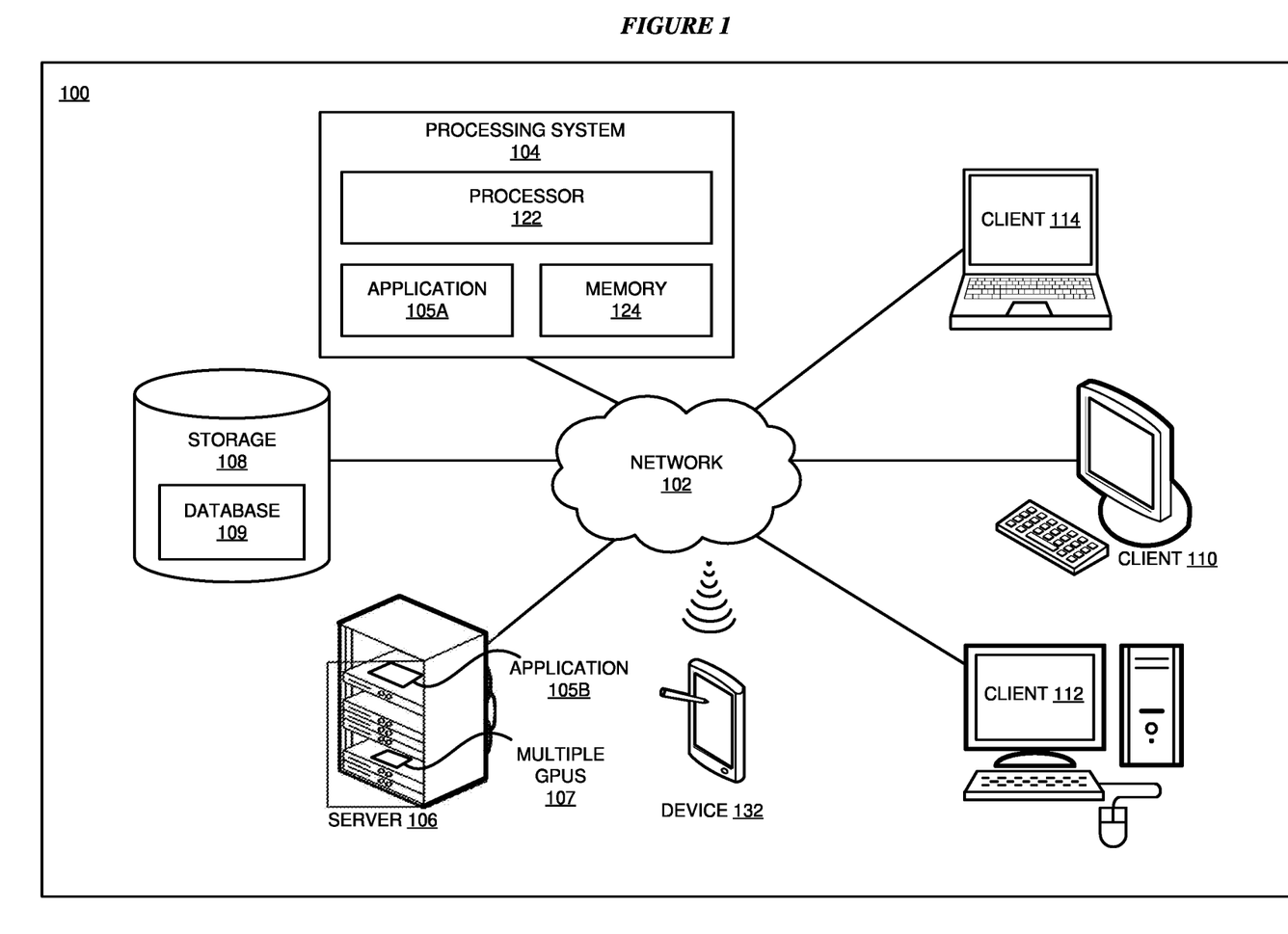
FIG. 1 depicts a block diagram of a network of data processing systems in which illustrative embodiments may be implemented.
Figure 2:
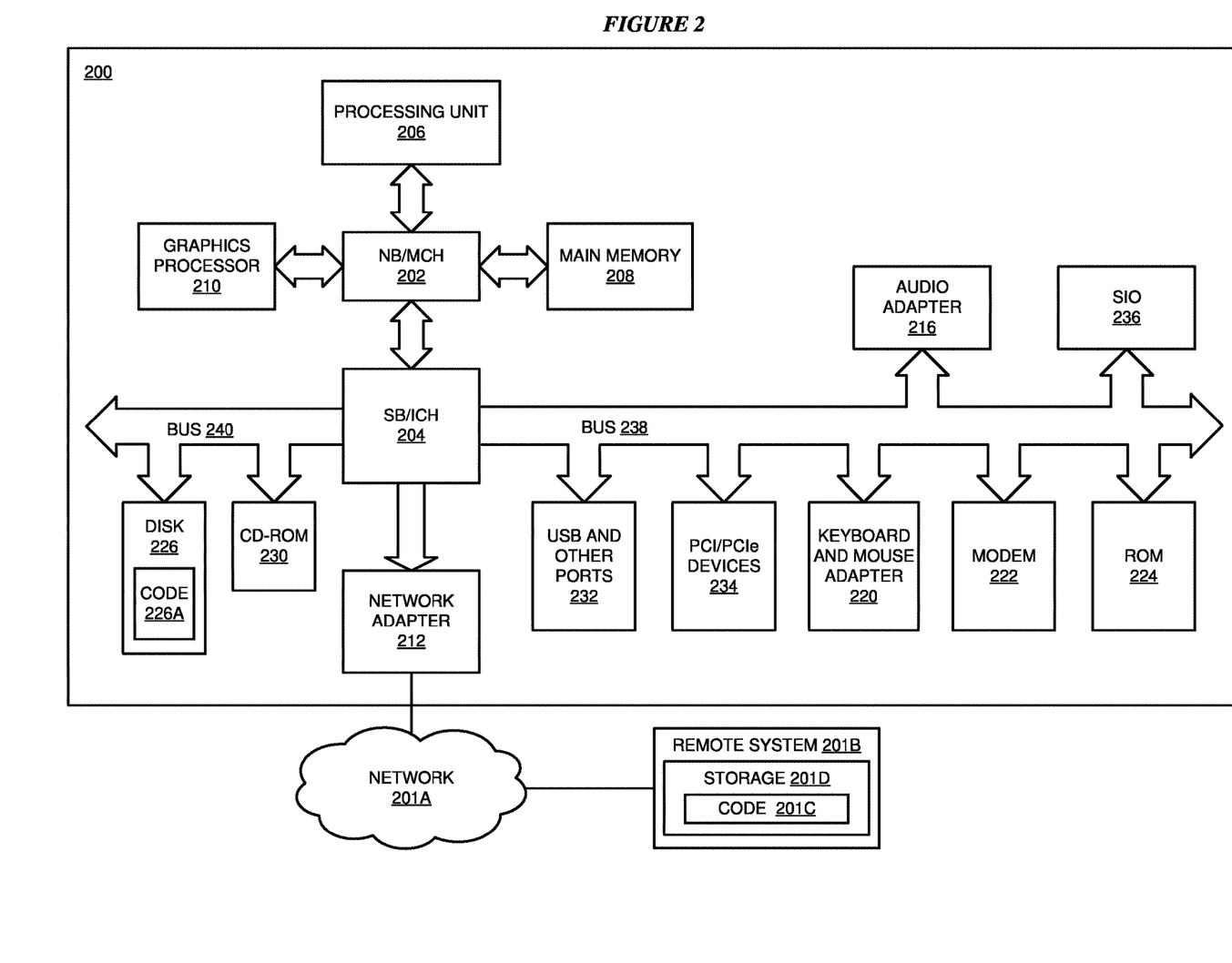
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
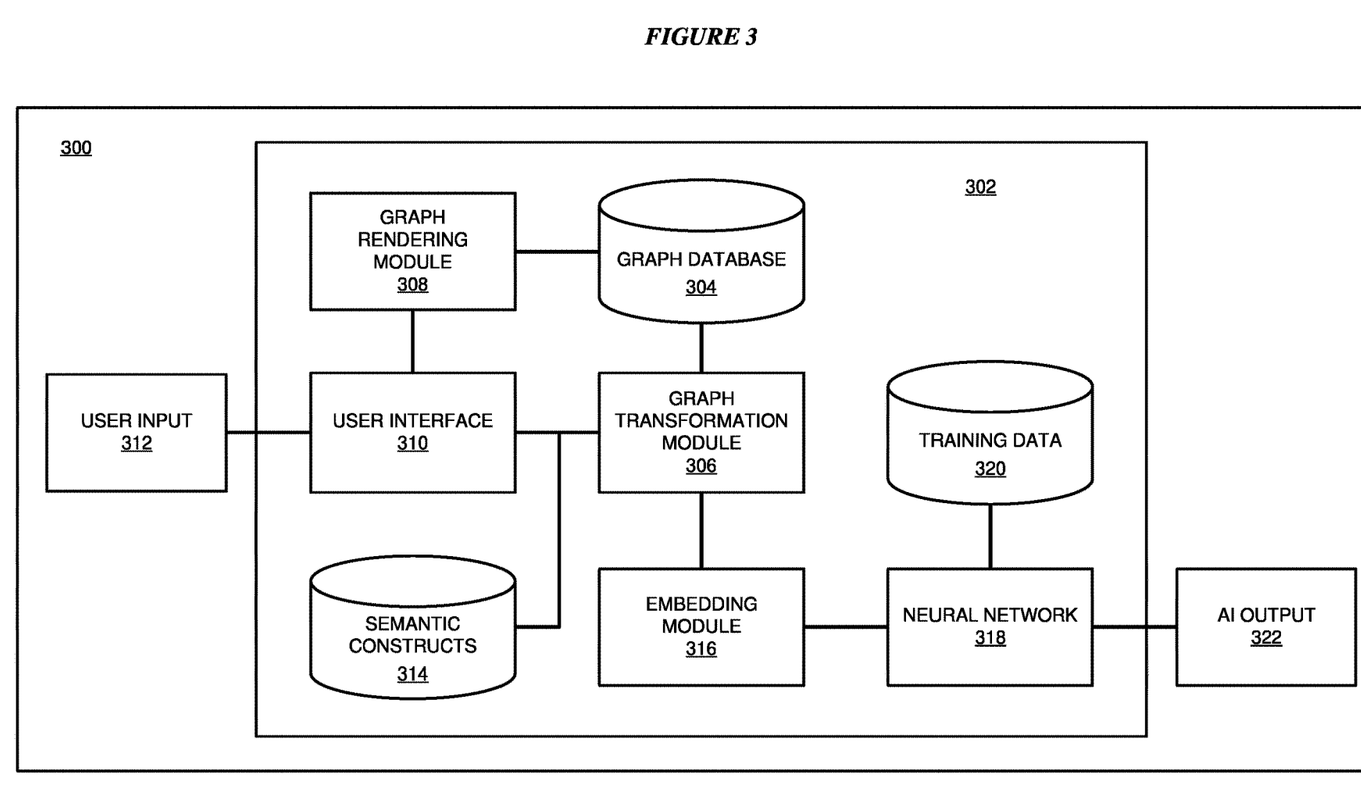
FIG. 3 depicts a block diagram of an example configuration for providing a graph transformation in accordance with an illustrative embodiment.

With reference to FIG. 3, this figure depicts a block diagram of an example configuration 300 for providing a graph transformation in accordance with an illustrative embodiment. The example embodiment includes a transformation application 302. In a particular embodiment, application 302 is an example of application 105A/105B of FIG. 1.

In some embodiments, the transformation application 302 includes a graph database 304, a graph transformation module 306, a graph rendering module 308, a user interface 310 for receiving user input 312, and a memory 314 for storing semantic constructs. In an embodiment, the transformation application further includes one or more of an embedding module 316, a neural network 318, and a memory 320 for storing training data for training the neural network 318 to output an AI output 322. In alternative embodiments, the graph transformation application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the graph database 304 provides a memory for storing graph data, including data that is represented by a graph before, during, and after graph transformations by graph transformation module 306. The data can be stored in the graph database 304 according to any of a variety of known formats that store graph structure information with data represented by the graph. For example, an adjacency list can store nodes and edges as objects, where node objects include a list of adjacent nodes and metadata, such as key:value pairs, and edge objects store incident nodes. The information allows a graph rendering module 308 to provide a visual display of the graph, for example on a user interface 310. The visual representation of the graph allows a user to inspect the graph and provide user input 312 to the graph transformation module 306 via user interface 310, including input for hyperparameters and ontological conditions for the graph transformation process.

Figure 4:
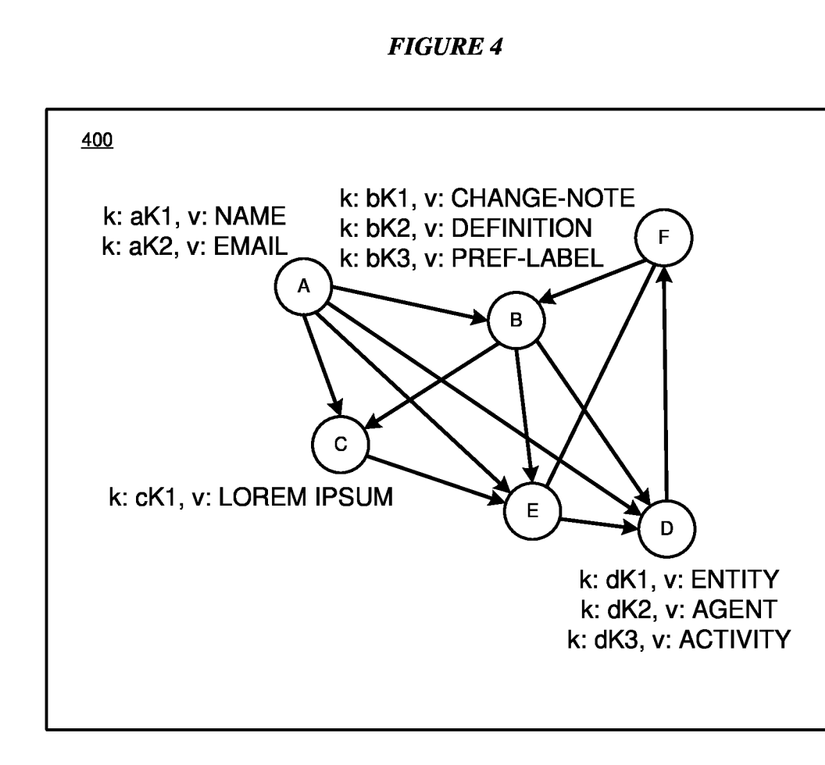
FIG. 4 depicts a graph having an initial graph structure in accordance with an illustrative embodiment.
Figure 5:
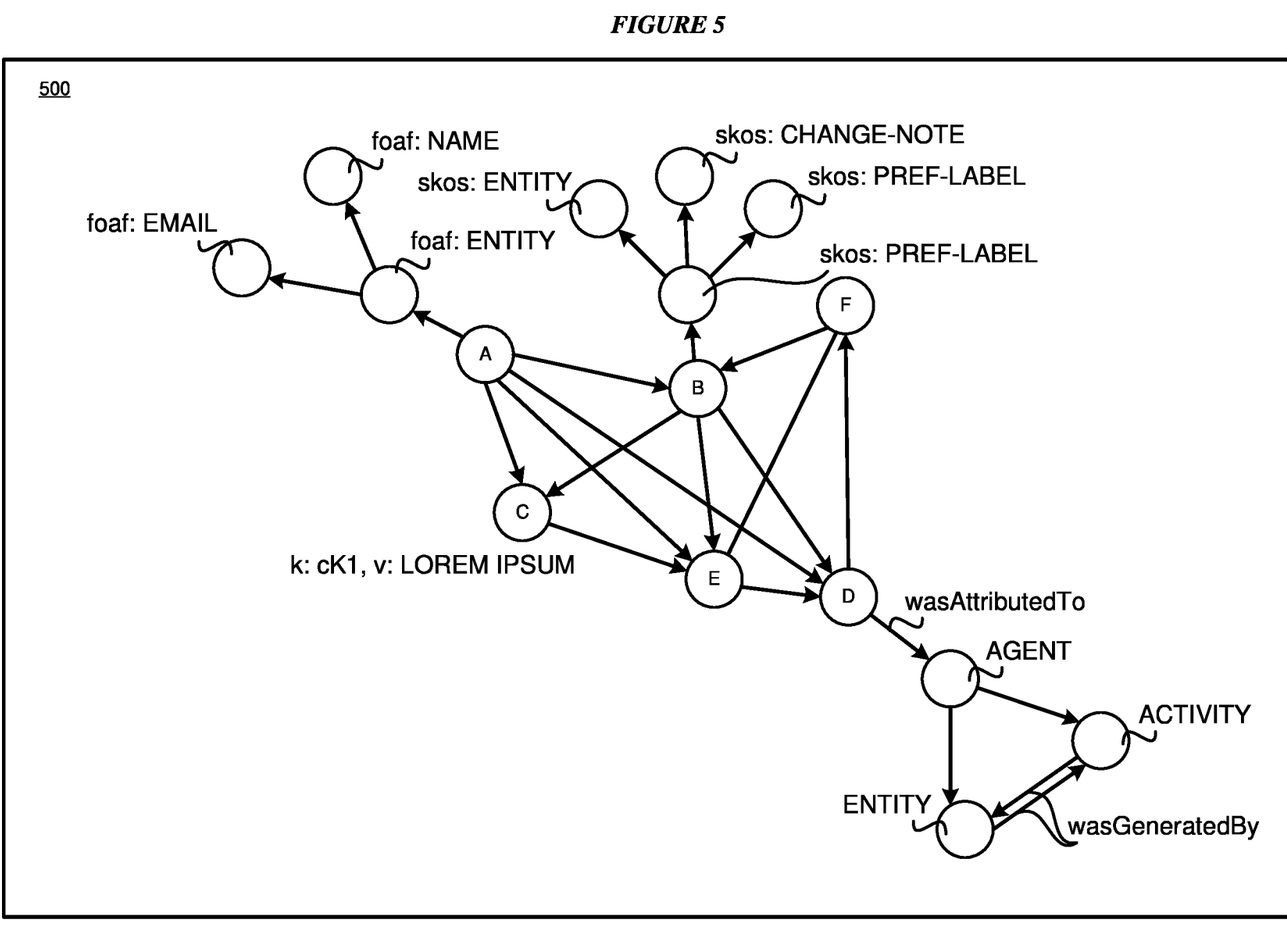
FIG. 5 depicts a graph having a transformed graph structure in accordance with an illustrative embodiment.
Figure 6:
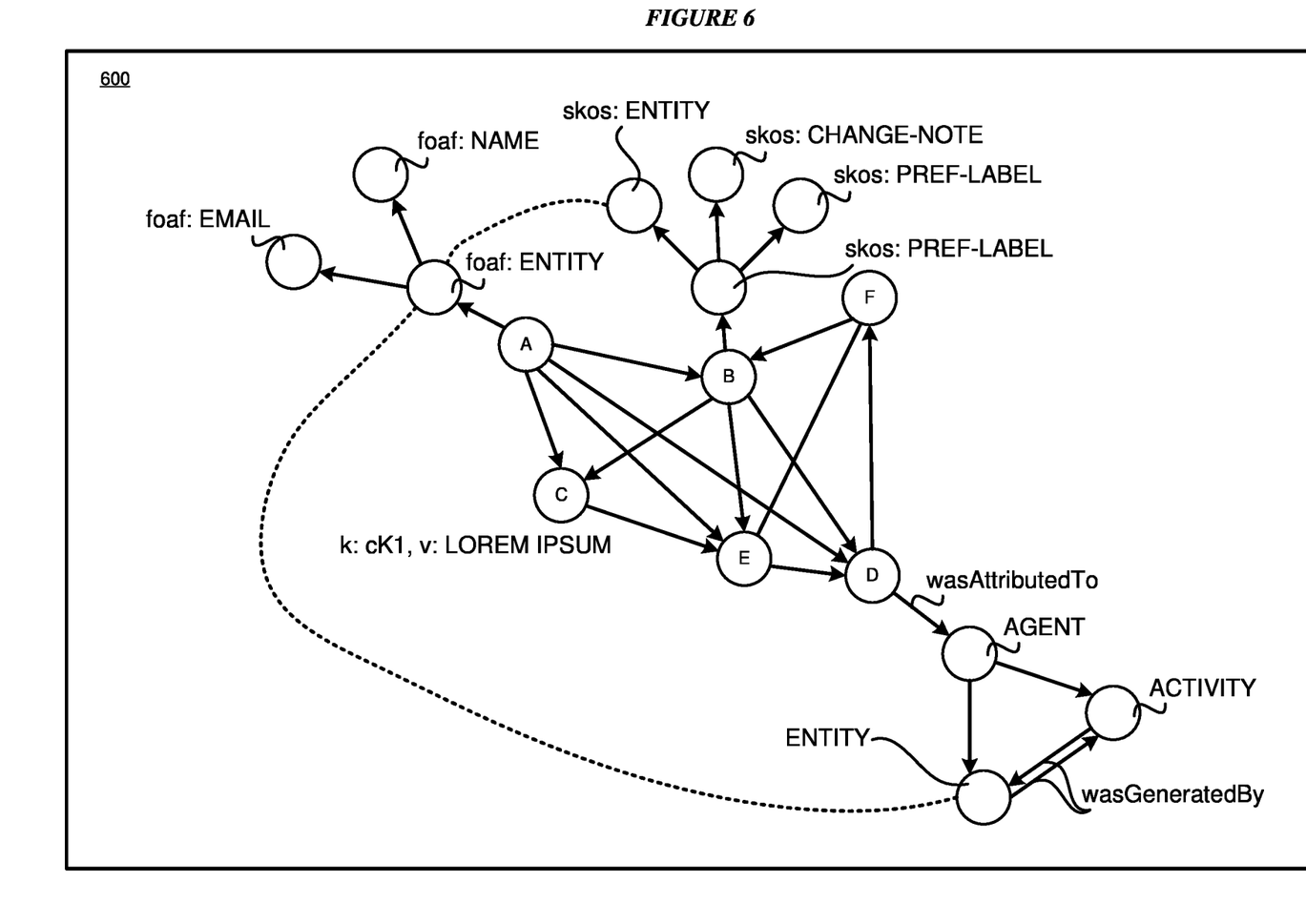
FIG. 6 depicts a graph having a further transformed graph structure in accordance with an illustrative embodiment.

In an embodiment, the graph transformation module 306 transforms a graph structure by detaching key:value pairs from being properties of nodes and adding the key:value pairs back into the graph as new nodes. An example of the transformation performed on a graph by the graph transformation module 306 is shown in FIGS. 4-6, where FIG. 4 shows an example of a graph before transformation, FIG. 5 shows an example of a graph after some transformation, and FIG. 6 shows an example of a graph after further transformation. FIGS. 4-6 are discussed in more detail below.

The user can provide an ontological condition that the graph transformation module 306 will use to identify metadata to alter. For example, in an embodiment, the user can input semantic construct information, or select from seman-tic construct information stored in memory 314 or elsewhere that the graph transformation module 306 will use to identify key:value pairs to detach and convert to new nodes. Thus, in an embodiment, the graph includes nodes that have key: value pairs that the graph transformation module 306 will extract based on common Ontological concepts. As a non-limiting example, in an embodiment, key:value pairs are used to associate demographic information with a node, so a user instructs the graph transformation module 306 to use the known Friend-of-a-Friend (FOAF)-derived set of semantic constructs to expand such key:value pairs into nodes. As another non-limiting example, metadata representative of change notes and repository-style information that indicates authorship and influences may leverage a combination of the known Simple Knowledge Organization System (SKOS) and the known Provenance (PROV)-inspired Ontological conditions for selecting metadata to transform from nodes.

In an embodiment, the graph transformation module 306 transforms the graph in the memory 304 into a new graph structure by creating new data in memory 304 representative of the new graph structure. In an embodiment, the graph transformation module 306 detaches metadata that meets an ontological condition from respective nodes in the new data of the new graph structure, and then associates the metadata with respective new nodes. In an embodiment, the graph transformation module 306 references, in the memory 304, new nodes created from detached metadata from source nodes (nodes from which metadata was detached) for the extracted metadata, as described below in connection with FIG. 5.

In an embodiment, the graph transformation module 306 detaches key:value pairs from being properties of a node and transforms them into respective nodes, edges, or triples that are arranged with associations that tie back into the graph. In an embodiment, the graph is augmented with additional relationships that indicate commonality between the decomposed metadata, resulting into the new nodes being connected to indicate relationships and commonality between decomposed edges.

In an embodiment, the transformed graph is provided to the embedding module 316. In an embodiment, the embedding module receives the graph and maps every node into some vector of numbers. In an embodiment, the embedding module 316 uses a function $f: u \rightarrow \mathbb{R}^d$ or some function of u maps to a representation vector $\mathbb{R}$ that is in a low-dimensional space d (e.g., d-2 for 2D two dimensional space (x-y graph) or 1-dimensional space (single dim vector). For example, in the original graph we have augmented with expanded nodes and relationships, giving vectorization algorithms more room for iterating through the graph, more related nodes for more meaningful data being captured in probability vectors. In an embodiment, the embedding module 316 will vectorize the graph using the following objection function shown below as expression (1).

$$J'(\theta) = \prod_{t=1}^{T} \prod_{-m \leq j \leq m, j \neq 0} P(W_{t+j} | W_t; \theta) \quad (1)$$

Expression (1) is a loss function or objective function in which m is a hyperparameter that sets the size of the node window, and the algorithm will traverse the window W for each node as a center node, with t being the position of the center node. For each node t=1 to T, with T being the set of all nodes in the graph, the algorithm is going to predict the surrounding nodes from will predict surrounding nodes in positions m before the center mode to m after the center node. The algorithm seeks to choose vectors such that the probability of a prediction is maximized. in a window of "radius" m of every word, with the goal being to maximize the probability of any context node given the current center node. The expression (1) will go through each node t=1 to T, with a 2*m window (m before t, and m after t). The expression (1) has a probability distribution that will give a probability of a nod appearing in the context of the center node. The parameter θ is the vector representation of the nodes, which is preferably selected to maximize the probability With reference to FIG. 4, this figure depicts a graph 400 in accordance with an illustrative embodiment. In a particular embodiment, graph 400 has an initial graph structure prior to transformation by the graph transformation module 306 of FIG. 3.

In the illustrated embodiment, the graph 400 includes nodes A-F, with nodes A-D having key:value pairs as metadata. Node A has key:value pairs aK1:NAME and aK2:EMAIL; Node B has key:value pairs bK1:CHANGE-NOTE; bK2:DEFINITION; bK3:PREF-LABEL; Node C has key:value pair cK1:LOREM IPSUM; and Node D has key:value pairs dK1:ENTITY; dK2:AGENT; and dK3:AC-TIVITY. The illustrated examples of key:value pairs are merely examples and actual key:value pairs can be anything. Also, the number of key:value pairs illustrated is shown as an example only, and actual implementations can have any number of key:value pairs.

The illustrated embodiment of graph 400 shows an undirected property graph for example purposes only, and actual implementations are not so limited. An embodiment of the graph 400 includes any graph that is an abstract simplicial complex K of a topological space |K|, where an abstract simplicial complex is a simplicial complex of non-empty finite sets that is closed under the operation of taking non-empty subsets.

With reference to FIG. 5, this figure depicts a graph 500 in accordance with an illustrative embodiment. In a particular embodiment, the graph 500 has a graph structure resulting from a graph transformation process, for example as performed by the graph transformation module 306 of FIG. 3, after at least some processing of an initial graph, e.g., graph 400 shown in FIG. 4.

In the illustrated embodiment, a graph transformation process has added new nodes foaf:ENTITY, foaf:NAME, and foaf:EMAIL connected by a new edge to node A, where these new nodes represent data that was formerly attached as key:value pairs to node A (e.g., as in graph 400 shown in FIG. 4). Similarly, in the illustrated embodiment, the graph transformation process has added new nodes connected to node B that represent data that was formerly attached as key:value pairs to node B. In the illustrated embodiment, the graph transformation process has added a new triple connected to node D that represents data that was formerly attached as key:value pairs to node D.

Thus, in the illustrated embodiment, an embodiment of the graph transformation process has replaced certain key:value pairs with new nodes using common ontological concepts. For example, in the illustrated embodiment, the graph transformation process used a FOAF-derived set of semantic constructs as a condition for selecting key:value pairs in the initial graph, where that condition was satisfied by the key:value pairs formerly attached to node A, which are now new nodes connected to node A. Also, in the illustrated embodiment, the graph transformation process used a SKOS-derived set of semantic constructs as a condition for selecting key:value pairs in the initial graph, where that condition was satisfied by the key:value pairs formerly attached to node B, which are now new nodes connected to node B. As another example, For example, in the illustrated embodiment, the graph transformation process used an ontological condition, for example based on an observation by an artificial intelligence-based process or by observation by a user that the initial graph had several key:value pairs related to activities generated by entities that could serve as the basis for new triples. That condition resulted in the graph transformation process selecting key:value pairs that were attached to node D in the initial graph and that satisfied this condition. As a result, the graph transformation process detached these key:value pairs from node D and added them as a new triple connected to node D.

With reference to FIG. 6, this figure depicts a graph 600 in accordance with an illustrative embodiment. In a particular embodiment, the graph 600 has a graph structure resulting from a graph transformation process, for example as performed by the graph transformation module 306 of FIG. 3, after processing of an initial graph, e.g., after processing of the graph 500, which is an intermediate graph structure resulting from at least some processing of the initial graph 400 shown in FIG. 4.

In the illustrated embodiment, the graph 600 compared to graph 500 shown in FIG. 5 includes new edges shown as broken lines. In the illustrated embodiment, the graph transformation process added the new edges based on commonality between the new nodes. In an embodiment, the graph transformation process detects commonalities, such as the common ENTITY designation shown in FIG. 6, to generate new edges.

Thus, in the illustrated embodiment, the graph 600 has been augmented from an initial graph (e.g., graph 400 shown in FIG. 4) to include an indication of commonality between decomposed key:value pairs that was not otherwise explicit in the initial graph. These new relationships result in the graph 600 that has been expanded compared to the initial graph (e.g., compared to initial graph 400 shown in FIG. 4), which gives vectorization algorithms (e.g., such as the process performed by embedding module 316 of FIG. 3) more room for iterating through the graph 600, and therefore provides more relevant nodes that provide meaningful data being captured in probability vectors.

Figure 7:
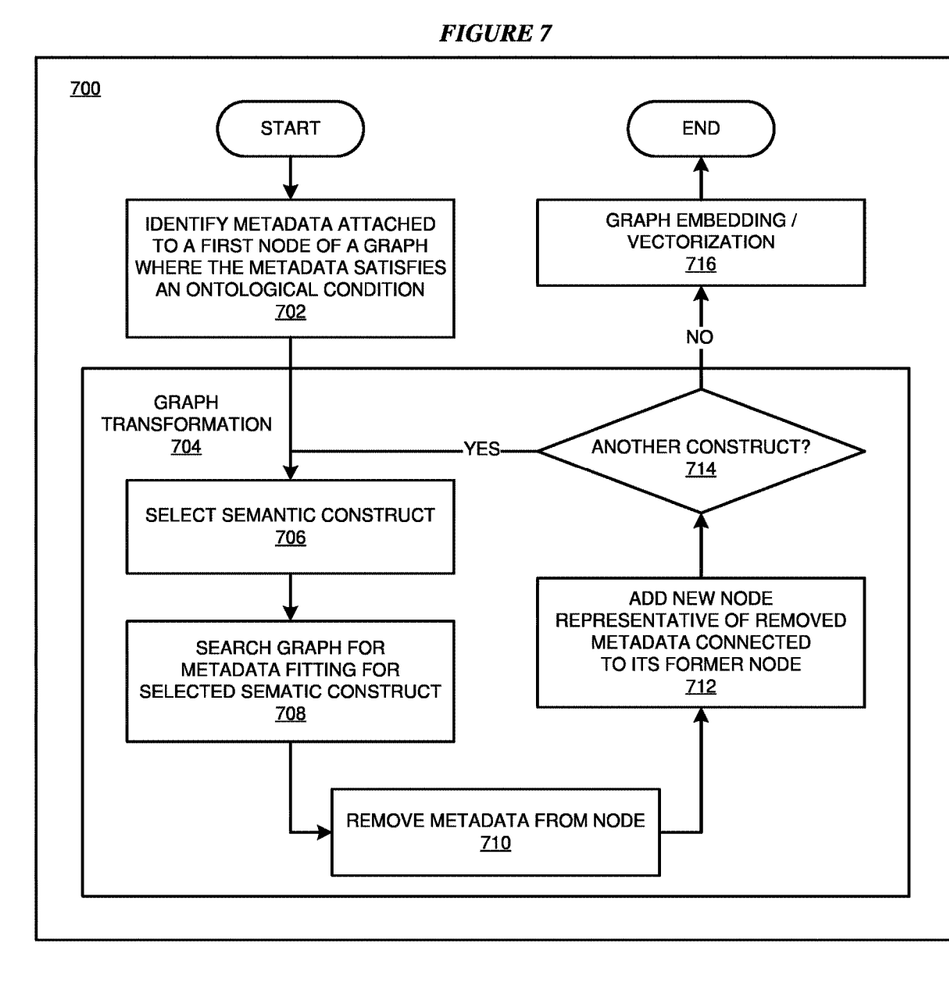
FIG. 7 depicts a flowchart of an example process for transforming a graph structure in accordance with an illustrative embodiment.

With reference to FIG. 7, this figure depicts a flowchart of an example process 700 for transforming a graph structure in accordance with an illustrative embodiment. In a particular embodiment, the transformation application 302 of FIG. 3 carries out the process 700.

In an embodiment, at block 702, the transformation application identifies metadata attached to a first node of a graph where the metadata satisfies an ontological condition. Next, at block 704, the transformation application performs a graph transformation process, for example performed by graph transformation module 306 in FIG. 3, which includes blocks 706-714. At block 706, graph transformation process selects an ontological condition, such as a semantic construct in the illustrated embodiment. Next, at block 708, the process uses the selected construct as a search condition and searches the graph for metadata that satisfies this condition. At block 710, for each metadata that satisfies the selected condition, the metadata is detached from its node, and at block 712, the metadata is added as new node(s) connected to respective nodes from which the metadata was detached. At block 714, the process determines whether there are additional ontological conditions. If so, the process returns to block 706; otherwise the process continues to block 716. At block 716, the transformed graph is vectorized, for example using an embedding process, such as the embedding process performed by the embedding module 316 of FIG. 3.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
loading into memory a graph having a graph structure, the graph being constructed according to an ontology and comprising a first node, the first node comprising metadata, the metadata satisfying an ontological condition according to the ontology;
transforming, in memory, a new graph structure from the graph structure, the transforming comprising:
creating new data in the memory representative of the new graph structure;
detaching, in the new data of the new graph structure that meets an ontological condition from respective nodes in the new data of the new graph structure, the metadata from the first node and adding key:value pairs back into the new graph structure as new nodes;
associating, in the memory, the metadata with a second node of the new nodes;
referencing, in the memory, the first node in the new graph structure from the second node in the new graph structure; and deriving vector representations of the new graph structure using an embedding process to train a neural network.

2. The computer implemented method of claim 1, wherein the graph is a property graph and further comprising:
storing graph data, including data that is represented by the graph before, during, and after graph transformation, wherein an adjacency list stores nodes and edges as objects, where node objects include a list of adjacent nodes and the metadata including the key:value pairs, and edge objects store incident nodes; and
providing a visual display of the graph.

3. The computer implemented method of claim 2, wherein the metadata is a key:value pair, the detaching includes detaching the key:value pairs from being properties of nodes and adding the key:value pairs back into the graph as the new nodes, and the key:value pairs are extracted based on ontological concepts.

4. The computer implemented method of claim 1, wherein the ontological condition is a user-specified condition or a semantic construct.

5. The computer implemented method of claim 1, wherein the embedding comprises mapping every node of the graph into some vector of numbers using a loss function or objective function:

$$J'(\theta) = \prod_{t=1}^{T} \prod_{-m \leq j \leq m, j \neq 0} P(W_{t+j} | W_t; \theta)$$

in which m is a hyperparameter that sets a size of a node window, and a window W the loss will be traversed for each node as a center node, with t being a position of the center node, and for each node t=1 to T, with T being a set of all nodes in the graph, and parameter θ is the vector representation of the nodes.

6. The computer implemented method of claim 1, wherein the transforming of the graph further comprises:
detaching, in the new data of the new graph structure, metadata from a third node, wherein the metadata thus detached from the third node satisfies the ontological condition; and associating, in the memory, the metadata detached from the third node with a fourth node; and referencing, in the memory, the third node in the new graph from the fourth node in the new graph.

7. The computer implemented method of claim 6, further comprising adding a third edge connecting the second node and the fourth node.

8. The computer implemented method of claim 1, further comprising deriving the vector representation of the graph using an iterative process on the new graph structure that constructs a new vector comprising a probability distribution and the vector representation is some vector of numbers mapped from every node.

9. A computer program product comprising one or more computer readable storage media, and program instructions collectively stored on the one or more computer readable storage media, the program instructions executable by controller circuitry to cause the controller circuitry to perform operations comprising:
loading into memory a graph having a graph structure, the graph being constructed according to an ontology and comprising a first node, the first node comprising metadata, the metadata satisfying an ontological condition according to the ontology;
transforming, in memory, a new graph structure from the graph structure, the transforming comprising:
creating new data of the new graph structure;
detaching, in the new data of the new graph structure that meets an ontological condition from respective nodes in the new data of the new graph structure, the metadata from the first node and adding key:value pairs back into the new graph structure as new nodes;
associating, in the memory, the metadata with a second node;
referencing, in the memory, the first node in the new graph structure from the second node in the new graph structure; and
deriving vector representations of the new graph structure using an embedding process to train a neural network.

10. The computer usable program product of claim 9, wherein the graph is a property graph, and further comprising:
storing graph data, including data that is represented by the graph before, during, and after graph transformation, wherein an adjacency list stores nodes and edges as objects, where node objects include a list of adjacent nodes and the metadata including the key:value pairs, and edge objects store incident nodes; and
providing a visual display of the graph.

11. The computer usable program product of claim 10, wherein the metadata is a key:value pair.

12. The computer usable program product of claim 9, wherein the ontological condition is a user-specified condition.

13. The computer usable program product of claim 9, wherein the ontological condition includes a semantic construct.

14. The computer usable program product of claim 9, wherein the stored program instructions are stored in a computer readable storage device in a data processing system, and wherein the stored program instructions are transferred over a network from a remote data processing system.

15. The computer usable program product of claim 9, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

16. A computer system comprising a processor and one or more computer readable storage media, and program instructions collectively stored on the one or more computer readable storage media, the program instructions executable by the processor to cause the processor to perform operations comprising:
loading into memory a graph having a graph structure, the graph being constructed according to an ontology and comprising a first node, the first node comprising metadata, the metadata satisfying an ontological condition according to the ontology;
transforming, in memory, a new graph structure from the graph structure, the transforming comprising:
creating new data of the new graph structure;
detaching, in the new data of the new graph structure, the metadata from the first node;
associating, in the memory, the metadata with a second node;

referencing, in the memory, the first node in the new graph structure from the second node in the new graph structure;

deriving vector representations of the new graph structure using an embedding process to train a neural network.

17. The computer system of claim 16, wherein the graph is a property graph, and the detaching includes detaching the key:value pairs from being properties of nodes and adding the key:value pairs back into the graph as the new nodes, and the key:value pairs are extracted based on ontological concepts, and further comprising:

storing graph data, including data that is represented by the graph before, during, and after graph transformation, wherein an adjacency list stores nodes and edges as objects, where node objects include a list of adjacent nodes and the metadata including the key:value pairs, and edge objects store incident nodes; and providing a visual display of the graph.

18. The computer system of claim 17, wherein the detaching is in the new data of the new graph structure that meets an ontological condition from respective nodes in the new data of the new graph structure, and further comprises adding key:value pairs back into the new graph structure as new nodes, wherein the metadata is a key:value pair.

19. The computer system of claim 16, wherein the ontological condition is a user-specified condition.

20. The computer system of claim 16, wherein the ontological condition includes a semantic construct.

21. A computer implemented method comprising:

loading into memory a graph structure, the graph being constructed according to an ontology and comprising first and second nodes, wherein the first node comprises first metadata, the first metadata satisfying a first ontological condition according to the ontology, and wherein the second node comprises second metadata, the second metadata satisfying a second ontological condition according to the ontology;

transforming, in memory, a new graph structure from the graph structure, the transforming comprising:

creating new data of the new graph structure;

detaching, in the new data of the new graph structure, the first metadata from the first node and the second metadata from the second node;

associating, in the memory, the first metadata with a third node and the second metadata with a fourth node; and referencing, in the memory, the first node in the new graph structure from the third node in the new graph structure and the second node in the new graph from the fourth node in the new graph; and deriving vector representations of the new graph structure using an embedding process to train a neural network.

22. The computer implemented method of claim 21, further comprising deriving the vector representations of the graph using an iterative process on the new graph structure that constructs a new vector comprising a probability distribution.

23. A computer program product comprising one or more computer readable storage media, and program instructions collectively stored on the one or more computer readable storage media, the program instructions executable by controller circuitry to cause the controller circuitry to perform operations comprising:

loading into memory a graph structure, the graph being constructed according to an ontology and comprising first and second nodes, wherein the first node comprises first metadata, the first metadata satisfying a first ontological condition according to the ontology, and wherein the second node comprises second metadata, the second metadata satisfying a second ontological condition according to the ontology;

transforming, in memory, a new graph structure from the graph structure, the transforming comprising:

creating new data of the new graph structure;

detaching, in the new data of the new graph structure, the first metadata from the first node and the second metadata from the second node;

associating, in the memory, the first metadata with a third node and the second metadata with a fourth node; and referencing, in the memory, the first node in the new graph structure from the third node in the new graph and the second node in the new graph structure from the fourth node in the new graph; and deriving vector representations of the new graph structure using an embedding process to train a neural network.

24. The computer usable program product of claim 23, wherein the stored program instructions are stored in a computer readable storage device in a data processing system, and wherein the stored program instructions are transferred over a network from a remote data processing system, and wherein the detaching is in the new data of the new graph structure that meets the ontological condition from respective nodes in the new data of the new graph structure.

25. The computer usable program product of claim 23, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

* * * * *